US007941830B1

(12) United States Patent
Painter et al.

(10) Patent No.: US 7,941,830 B1
(45) Date of Patent: May 10, 2011

(54) AUTHENTICATION PROTOCOL FOR NETWORK SECURITY SERVICES

(75) Inventors: Mark W. Painter, Fremont, CA (US); Shuosen Robert Liu, San Jose, CA (US); Jianda Li, San Jose, CA (US); Kong Yew Chan, San Mateo, CA (US)

(73) Assignee: Trend Micro Incorporated, Tokyo (JP)

( * ) Notice: Subject to any disclaimer, the term of this patent is extended or adjusted under 35 U.S.C. 154(b) by 1138 days.

(21) Appl. No.: 11/592,000

(22) Filed: Nov. 1, 2006

(51) Int. Cl.
*G06F 7/04* (2006.01)
*G06F 15/16* (2006.01)
*G06F 17/30* (2006.01)
*G06F 9/00* (2006.01)
*G06F 17/00* (2006.01)
*H04L 29/06* (2006.01)

(52) U.S. Cl. ................ 726/5; 726/2; 726/3; 726/11
(58) Field of Classification Search ............... 726/2, 3, 726/5, 11, 12, 14, 16, 17, 21
See application file for complete search history.

(56) References Cited

U.S. PATENT DOCUMENTS

| 5,623,600 | A | 4/1997 | Ji et al. | |
|---|---|---|---|---|
| 6,195,587 | B1 | 2/2001 | Hruska et al. | |
| 6,938,097 | B1 | 8/2005 | Vincent et al. | |
| 7,010,807 | B1 | 3/2006 | Yanovsky | |
| 7,545,748 | B1* | 6/2009 | Riddle | 370/235 |
| 2002/0052968 | A1* | 5/2002 | Bonefas et al. | 709/231 |
| 2004/0015725 | A1* | 1/2004 | Boneh et al. | 713/201 |
| 2004/0078604 | A1* | 4/2004 | Rice et al. | 713/202 |
| 2005/0120221 | A1* | 6/2005 | Arnold et al. | 713/182 |
| 2007/0162766 | A1* | 7/2007 | Watanabe | 713/193 |

OTHER PUBLICATIONS

Microsoft Computer Dictionary, Fifth Edition, May 1, 2002.*
What is SSL and what are Certificates?, SSL Certificates HOWTO, 6 sheets [retrieved on Oct. 28, 2006]. Retrieved from the internet: http://tldp.org/HOWTO/SSL-Certificates-HOWTO/x64.html.
Microsoft TechNet, "Unsolicited Commercial E-Mail Prevention and Filtering Performance Analysis", Jan. 1999, pp. 1-14, [retrieved on Nov. 2, 2006]. Retrieved from the internet: http://www.microsoft.com/technet/archive/mcis/rkspmcpa.mspx?pf=true.
Martin Roesch, "Snort-Lightweight Intrusion Detection for Networks", 13th LISA Conference, 1999, 17 sheets, pp. 229-238 of the Proceeding, [retrieved on Nov. 2, 2006]. Retrieved from the internet: http://www.usenix.org/events/lisa99/full_papers/roesch/roesch_html/.
John Wack, et al. "Guide to Firewall Selection and Policy Recommendations", Oct. 2001, pp. 1-63, NIST Special Publication X-X, National Institute of Standards and Technology, U.S. Department of Commerce.

* cited by examiner

*Primary Examiner* — Edan Orgad
*Assistant Examiner* — Jahangir Kabir
(74) *Attorney, Agent, or Firm* — Okamoto & Benedicto LLP

(57) ABSTRACT

In one embodiment, an authentication protocol used in a network security service is performed over non-secure connection, such as HTTP. A router subscribing to the service may send a service request for information about a URL to a server computer providing the service. The service request may be included in a first data set posted by the router to the server computer. The first data set may be described by an HTML form and include an encrypted device authenticator used by the server computer to validate the router. The first data set may further include a server authentication code. In responding to the service request, the server computer returns the server authentication code to the router along with information about the URL. The response may be in a second data set, such as an XML document sent by the server computer to the router over an HTTP connection.

6 Claims, 3 Drawing Sheets

AUTHENTICATION PROTOCOL FOR NETWORK SECURITY SERVICES

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The present invention relates generally to computer networks, and more particularly but not exclusively to authentication protocols for network security services.

2. Description of the Background Art

A computer network allows server computers to provide various services to devices connected to the network. For sensitive transactions, a secure connection may be established between a server computer and a device. For example, Secure Sockets Layer (SSL) technology may be employed with the Hyper Text Transfer Protocol (HTTP) to provide a secure connection between two computers using a protocol referred to as "HTTP over SSL" (HTTPS). A problem with HTTPS is that it uses certificates and uses full encryption of transmitted data, resulting in relatively high processing overhead. Thus, although HTTPS is adequate for most sensitive transactions, HTTPS may not be suitable in applications where authentication needs to be performed often and relatively fast, such as in services providing information about network addresses. On the Internet, for example, there are various categories of websites including those that provide inappropriate information, perpetuate fraudulent activities, distribute spywares and other malicious codes, to name a few examples. Information about these websites may be maintained in a database in a server computer, which provides the information as a service to subscribing devices. Communications between the server computer and the subscribing devices have to be relatively secure to prevent unauthorized devices from accessing the service or otherwise compromising the information received by the subscribing devices. However, requiring a fully secured connection, such as an HTTPS connection, between the server computer and the subscribing devices may slow down access to the service.

SUMMARY

In one embodiment, an authentication protocol used in a network security service is performed over non-secure connection, such as HTTP. A router subscribing to the service may send a service request for information about a URL to a server computer providing the service. The service request may be included in a first data set posted by the router to the server computer. The first data set may be an HTTP Post, which may be described using HTML, and include an encrypted device authenticator used by the server computer to validate the router. The first data set may further include a server authentication code. In responding to the service request, the server computer returns the server authentication code to the router along with information about the URL. The response may be in a second data set, such as an XML document sent by the server computer to the router over an HTTP connection.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
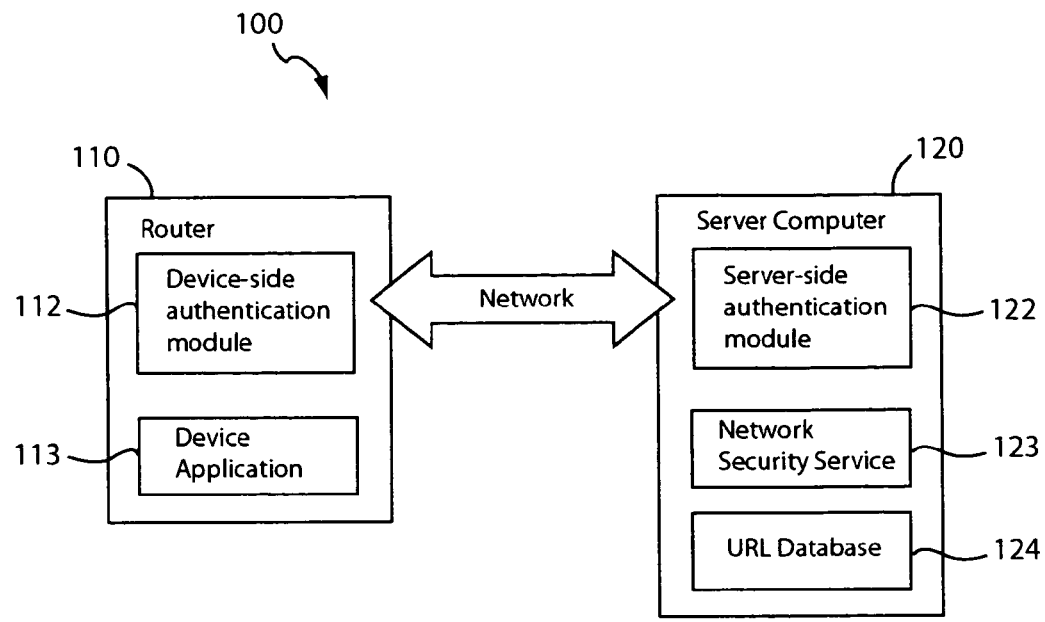
FIG. 1 shows a system for providing network security services in accordance with an embodiment of the present invention.

FIG. 1 shows a system 100 for providing network security services in accordance with an embodiment of the present invention. The system 100 may include a server computer providing a network security service and a device subscribing to the service. In the example of FIG. 1, the device comprises a router 110, while the server computer comprises a server computer 120 for providing information about network addresses. Information about network addresses may be used for network security purposes by, for example, blocking access to certain network addresses. The router 110 and the server computer 120 may communicate over a computer network, such as the Internet. The router 110 is one of many devices subscribing to the service provided by the server computer 120.

In one embodiment, the server computer 120 maintains information about websites accessible over the Internet in a uniform resource locator (URL) database 124. Upon encountering network traffic containing a URL, the router 110 may send a service request to the server computer 120 for information about the URL, such as the category of the website having the URL. The server computer 120 may check the URL against the database 124 to determine the website's category. In one embodiment, the database 124 includes a listing of URLs and the category for each listed URL. The categories may include phishing, adware, pornography, politics, shopping, real estate, and so on. The database 124 may be populated manually by human researchers surfing the Internet and gathering information about websites. Other suitable ways of populating the database 124 may also be used without detracting from the merits of the present invention. In response to the service request, the server computer 120 provides the information about the URL to the router 110. The router 110 may use the information about the URL to decide what to do to packets of the network traffic. For example, the router 110 may be configured to perform a network security function by blocking traffic to and from phishing websites. In that case, the router 110 may block traffic to and from a URL if the server computer 120 indicates that the URL is that of a website belonging to the phishing category.

The router 110 may comprise a device-side authentication module 112 and a device application 113. The authentication module 112 may comprise computer-readable program code for authenticating network communications between the router 110 and the server computer 120. In one embodiment, the authentication module 112 is configured to register to subscribe to a service provided by the server computer 120, to send service request to the server computer 120, and to authenticate communications received from the server computer 120. The device application 113 may comprise an application program that makes use of information received from the server computer 120. For example, the device application 113 may be configured to block or allow packets going to or coming from particular categories of websites or computers that have a particular reputation. The device application 113 may generate a service request for URL information and pass that service request to the authentication module 112 for forwarding to the server computer 120. The authentication module 112 may receive information about the URL from the server computer 120 and pass that information to the device application 113.

The server computer 120 may comprise a server-side authentication module 122, a network security service 123, and the URL database 124. The authentication module 122 may comprise computer-readable program code for authenticating network communications between the server computer 120 and the router 110. In one embodiment, the authentication module 122 is configured to receive subscription service registration from the router 110, to receive service requests from the router 110, and to authenticate communications received from the router 110. The network security service 123 may comprise computer-readable program code for providing network security services to subscribing computers, which in this example include the router 110. In one embodiment, the network security service 123 provides information about network addresses, which in this example comprise URLs. The authentication module 122 may receive service requests for URL information and pass the requests to the network security service 123 for processing. The network security service 123 may consult the database 124 to find information about the URLs and pass the information to the authentication module 122, which then provides the information to the requesting devices.

In one embodiment, the router 110 and the server computer 120 communicate by exchanging data over an HTTP connection. A first data set sent by the router 110 to the server computer 120 may be expressed in the hypertext markup language (HTML), for example. HTML is preferred because it is relatively compact and easy to read and can be transformed into an HTML POST request via commonly understood mechanisms such as a web browser. In response to the router 110, the server computer 120 may send a second data set to the router 110. The second data set may comprise an XML document, for example.

Figure 2:
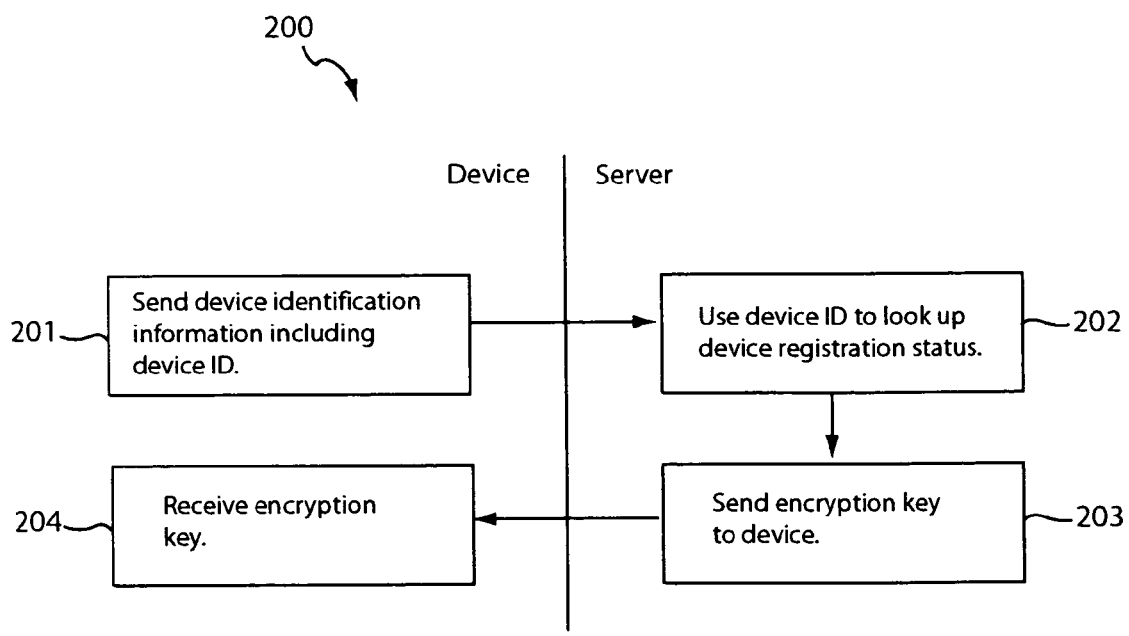
FIG. 2 shows a flow diagram of a method of registering a device to subscribe to a network security service in accordance with an embodiment of the present invention.

Referring now to FIG. 2, there is shown a flow diagram of a method 200 of registering a device to subscribe to a network security service in accordance with an embodiment of the present invention. Steps 201 and 204 may be performed by the subscribing device (e.g., the router 110), while steps 202 and 203 may be performed by the server computer providing the network security service (e.g., the server computer 120). In the example of FIG. 2, the steps 201 and 204 are performed by the authentication module 112 in the router 110, and the steps 202 and 203 are performed by the authentication module 122 in the server computer 120.

In one embodiment, the method 200 is performed over a fully secure connection. In one embodiment, steps 201-204 are performed over an HTTPS connection. As will be more apparent below, a fully secure connection is not required once the router 110 has registered with the server computer 120. There is little or no performance impact in using a fully secure connection during the registration process because registration is typically performed only infrequently.

A purchasing process precedes the registration process. In the purchasing process, the operator of the router 110 ("customer") purchases a subscription to the network security service provided by the server computer 120. As part of the purchase, the customer provides the operator of the server computer 120 ("vendor") a device identifier for each device to be included in the subscription. In return, the service provider provides an encryption key for each of the devices. The purchasing process may occur in the background and may be done over emails, online purchase transaction, in person, etc.

A device identifier may be a code or combination of codes that identify a particular device, such as a serial number, IP address, MAC number, globally unique ID, or other identifier. The encryption key provided by the server computer 120 may be that for a conventional encryption/decryption algorithm, such as the Data Encryption Standard (DES).

To register to subscribe to the service, the router 110 sends device identification information to the server computer 120 (step 201), the device identification including the device identifier of the router 110. In one embodiment, this step is performed by the router 110 by posting an HTTP POST request to the server computer 120. An example HTTP POST request for this step is shown in table 1, using HTML to describe the POST request.

TABLE 1

<form method="POST"action="/ndsp/Register_Device">
  <input type="hidden" name="UDI" value="UDI">
</form>

As shown in the example of Table 1, the device identification information may include the router 110's device identifier ("UDI" string in table 1), as well as additional information.

The server computer 120 receives the device identification information to check the registration status of the router 110 (step 202). For example, the server computer 120 may look up the device identifier in a listing of devices authorized to register for subscription to the network security service. The server computer 120 may send an encryption key to the router 110 (step 203) if the router 110 is authorized to register with the service. The server computer 120 may send the encryption key in an extensible markup language (XML) document. An example XML document for sending the encryption key to the router 110 is shown in table 2.

TABLE 2

```
<?xml version="1.0" encoding="ISO8859-1" ?>
  <ndsp-response>
    <registered/>
    <des-key>DES_KEY</des-key>
  </ndsp-response>
```

In the example of table 2, the "DES_KEY" string includes the encryption key.

The server computer 120 may send an error message to the router 110 if the router 110 is not authorized to register with the service or if there is an error in the registration process. The error message may be in anXML document as shown in the example of table 3.

TABLE 3

```
<?xml version="1.0" encoding="ISO8859-1" ?>
  <ndsp-response>
    <error>Error_Cause</error>   // may be more than one instance
  </ndsp-response>
```

In the example of table 3, the "Error Cause" string may comprise the error message. The error message may indicate that the registration request is missing information, the device is not subscribed to the service, or other errors.

If the router 110 is authorized to register with the service and provided all needed information, the router 110 receives the encryption key (step 204) and uses it in subsequent communications with the server computer 120.

Figure 3A:
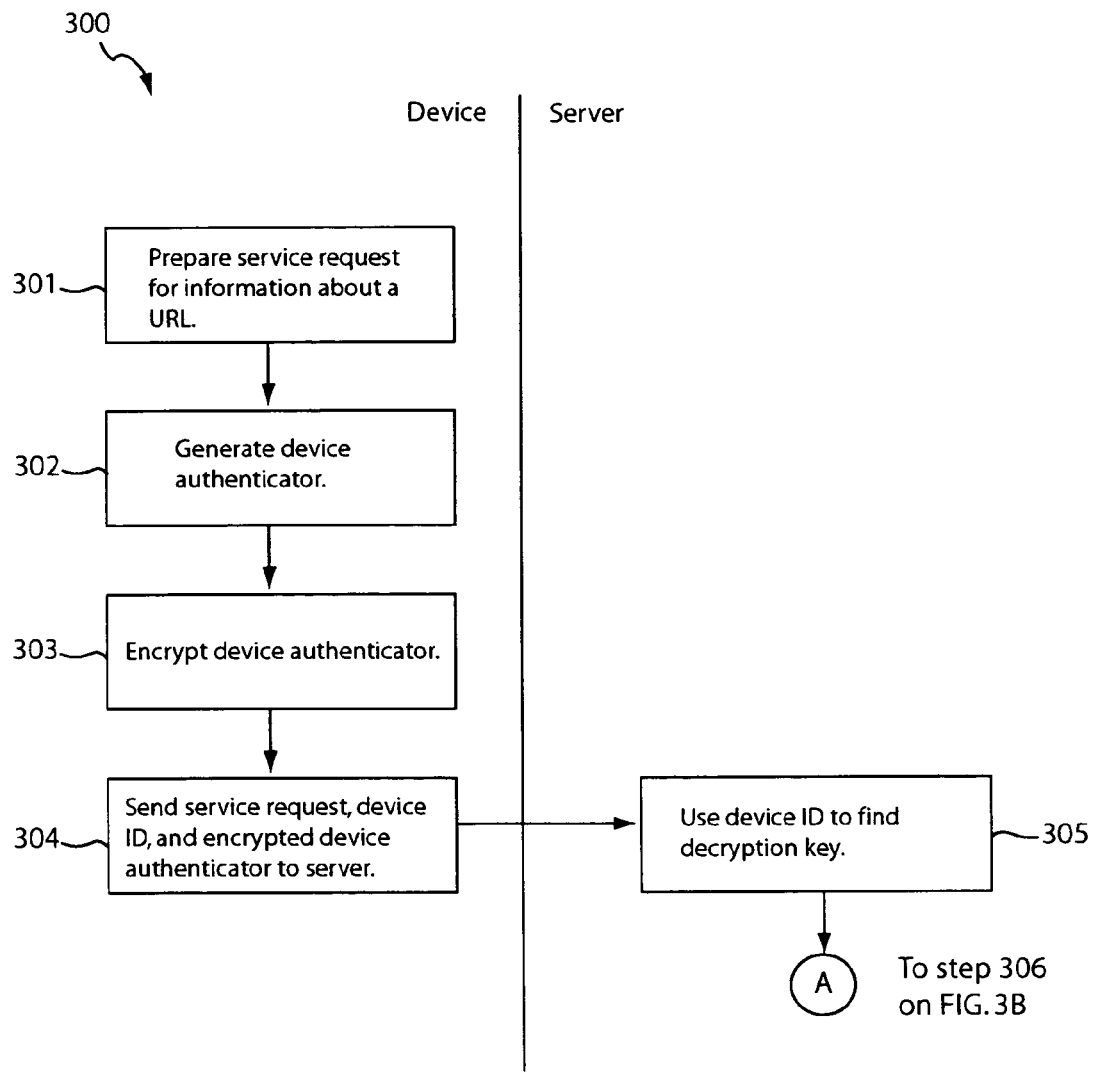
FIG. 3, which consists of FIG. 3A and FIG. 3B, shows a flow diagram of a method of authenticating communications in a network security service in accordance with an embodiment of the present invention.
Figure 3B:
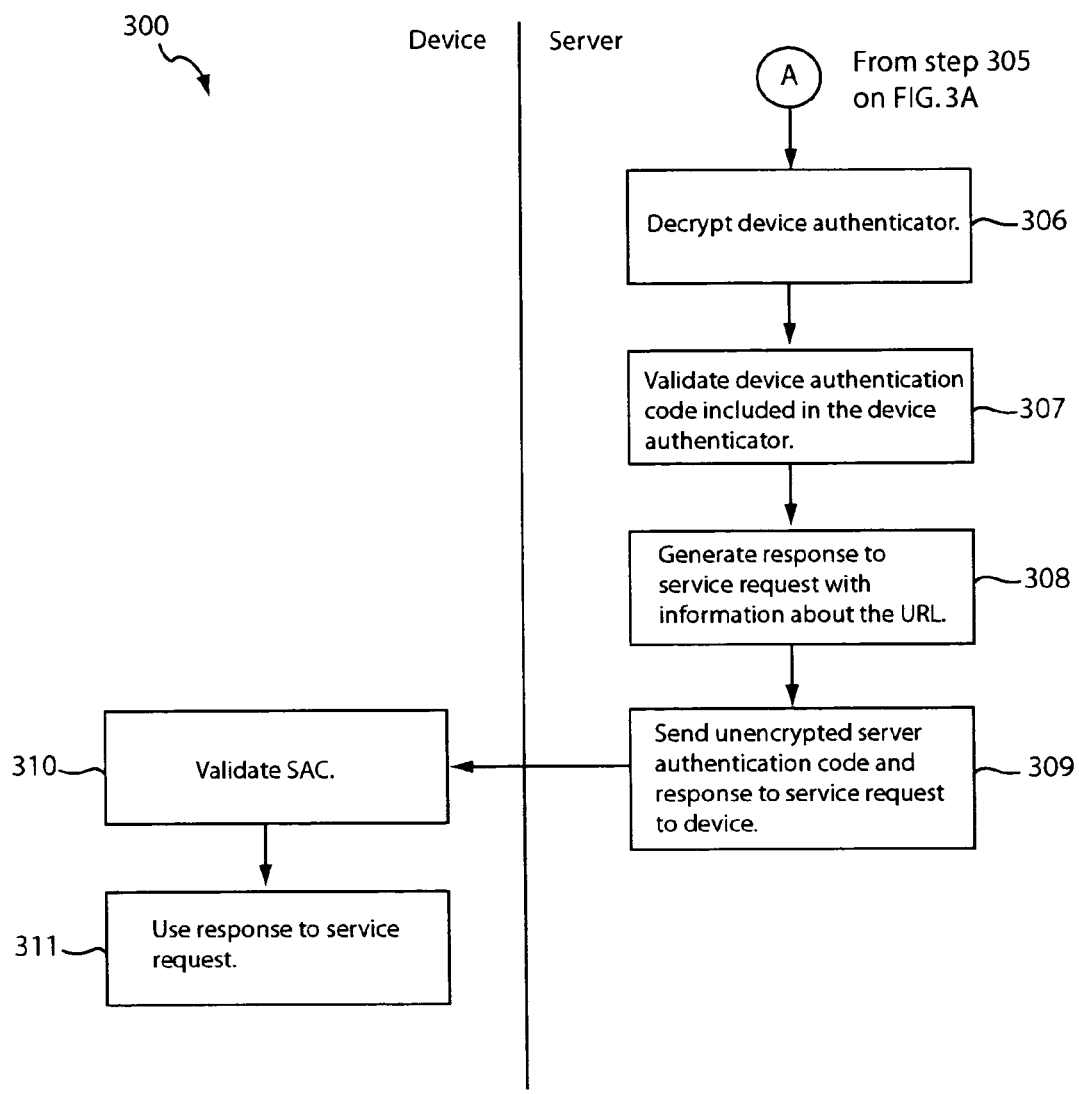

FIG. 3, which consists of FIG. 3A and FIG. 3B, shows a flow diagram of a method 300 for authenticating communications in a network security service in accordance with an embodiment of the present invention. Steps 301-304, 310, and 311 may be performed by the subscribing device (e.g., the router 110), while steps 305-309 may be performed by the server computer providing the network security service (e.g., the server computer 120). For example, in the router 110, the steps 301 and 311 may be performed by the device application 113 and the steps 302-304 and 310 may be performed by the authentication module 112. In the server computer 120, the steps 305-307 and 309 may be performed by the authentication module 122 and the step 308 may be performed by the network security service 123.

In one embodiment, the method 300 is performed over a non-secure connection, such as an HTTP connection, for reduced processing overhead. In the following example, the method 300 is performed by exchanging data over an HTTP connection.

To determine a category of a website having a URL indicated in a network traffic, the router 110 prepares a service request for information about the URL (step 301). The router 110 also prepares a device authenticator (step 302), which may comprise a device authentication code and a server authentication code.

The device authentication code may comprise a code or combination of codes that the server computer 120 may use to verify that the service request is from an authorized device. In one embodiment, the device authentication code comprises the device's device identifier concatenated with an agreed up (e.g., during the purchasing process) or predetermined concatenation value. The concatenation value may be the device's serial number, IP address, or other value. Generally speaking, the device authentication code is an implicitly or explicitly agreed secret code known to the router 110 and verifiable by the server computer 120. The server authentication code may comprise a code or combination of codes for verifying that a response to the service request is from the server computer 120. The router 110 may randomly generate the server authentication code, for example. For increased security, the router 110 may generate a different server authentication code for each service request sent to the server computer 120. Using the encryption key received from the server computer 120 during registration, the router 110 encrypts the server authentication code and the device authentication code.

The router 110 encrypts the device authenticator (step 303) using the key provided to the router 110 during the registration process (e.g., see steps 203 and 204 of FIG. 2). The router 110 then sends the service request for URL information, its device identifier, and the encrypted device authenticator to the server computer 120 (step 304). Note that the device identifier and the service request are sent in the clear (i.e., unencrypted) in this embodiment.

The service request, device identifier, and device authenticator may be sent by the router 110 to the server computer 120 as an HTTP POST request. An example data that may be posted to the server computer 120 for this purpose is shown in table 4, using HTML to describe the content of the HTTP POST.

TABLE 4

```
<form method=+POST" action="/ndsp/Classify_URL">
  <input type="hidden" name="requested_URL" maxlength="8192" value="URL" >
  <input type="hidden" name="UDI" value="UDI">
  <input type="hidden" name="DEVICE_AUTHTICATOR" value="DEVICE_AUTHTICATOR">
</form>
```

In the example of table 4, the "URL" string comprises the URL for which information is requested, the "UDI" string comprises the device identifier of the router 110, and the "DEVICE_AUTHENTICATOR" string comprises the encrypted device authenticator. Only the "DEVICE_AU-THENTICATOR" string is encrypted in the example of HTML form of table 4.

The server computer 120 may use the device identifier to find the correct decryption key for the device authenticator (step 305). For example, the server computer 120 may have a listing of encryption keys given to particular devices, each of which is identified by their corresponding device identifiers.

The server computer 120 may use the decryption key to decrypt the device authenticator (step 306) and extract the device and server authentication codes. Note that there is some performance overhead in decrypting the device authentication code. To further increase performance with minimal impact on security, the router 110 may vary the content of the device authenticator from time to time, but not every time a service request is sent. For example, the router 110 may generate a new server authentication code for every few service requests and not for each service request. In those cases, the device authenticator will be identical for several service requests, and the server computer 120 only has to decrypt the first of identical device authenticators (e.g., by caching the first device authenticator prior to decryption).

The server computer 120 may validate the device authentication code to verify if the router 110 is subscribed to the service (step 307). For example, the server computer 120 may parse the device authentication code to look for the device identifier of the router 110 and the agreed upon or predetermined concatenation value.

If the device authentication code is valid, the server computer 120 generates a response to the service request (step 308) by looking up information about the URL, such as by consulting the database 124. The server computer 120 may then send the response and the unencrypted server authentication code to the device (step 309). Note that the response and the server authentication code are sent in the clear in this embodiment. The server computer 120 may send the response in an XML document. An example XML document for responding to the service request in the case where the device authentication code is valid is shown in table 5.

TABLE 5

```
<?xml version="1.0" encoding="ISO8859-1" ?>
   <ndsp-response>
      <server-authentication>SERVER_AUTHENTICATION</server-authentication>
      <requested-URL>URL</requested-URL>
      <category>Category</category>    // may be more than one instance
   </ndsp-response>
```

In the example of table 5, the "SERVER AUTHENTICATION" string comprises the server authentication code received from the router 110, the "URL" string identifies the URL for which information is requested, and the "Category" string indicates the category of the website having the URL. In the example of table 5, the entire XML document is sent in the clear.

The server computer 120 may send an error message to the router 110 if the device authentication code is invalid. The error message may be in an XML document as shown in the example of table 6.

TABLE 6

```
<?xml version="1.0" encoding="ISO8859-1" ?>
   <ndsp-response>
      <requested-URL>URL</requested-URL>
      <error>Error_Cause</error>    // may be more than one instance
   </ndsp-response>
```

In the example of table 6, the "URL" string identifies the URL for which information is requested and the "Error Cause" string may comprise the error message. The error message may indicate missing information in the service request, the device is not registered or subscribed to the service, an out of date subscription, a service failure, or other errors.

The router 110 validates the server authentication code (step 310) to verify that the response to the service request is actually from the server computer 120. For example, the router 110 may compare the server authentication code received from the server computer 120 to that originally sent by the router 120 for the service request for URL information. Note that the URL for which information is requested may be included in the response, as in table 6, to allow the router 110 to match the server authentication code with the URL.

An authentication protocol for network security services has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of authenticating communications in a network security service between a server computer that provides the service and a router device subscribing to the service, the method comprising:

the router device generating a server authentication code;

the server computer receiving a posting of an HTML form over an HTTP connection, the HTML form being posted by the router device to the server computer to send a service request for information about a URL;

the server computer decrypting an encrypted device authenticator string included in the HTML form received from the router device to generate an unencrypted device authenticator, the unencrypted device authenticator including a device authentication code and the server authentication code generated by the router device;

the server computer validating the device authentication code to verify that the router device is authorized to send the service request to the server, the server computer validating the device authentication by looking for a device identifier of the router device in the device authentication code;

after determining that the device authentication code is valid, the server computer sending over an HTTP connection the server authentication code and information about the URL to the router device in an XML document, the server authentication code being included originally in the HTML form posted by the router device in the server computer; and after receiving the server authentication code and the information about the URL from the server computer in the XML document in the router device, the router device validating the server authentication code by comparing the server authentication code in the XML document received from the server computer against the server authentication code originally sent by the router device to the server computer to send the service request for the information about the URL.

2. The method of claim 1 wherein the service request for information about the URL is for determining a category of a website having the URL.

3. The method of claim 1 wherein the device authenticator comprises a concatenation of a device identifier of the router and a predetermined concatenation value.

4. The method of claim 1 wherein the server authentication code included in the XML document verifies to the router that the XML document is from the server.

5. The method of claim 1 wherein the encrypted device authenticator included in the HTML from is encrypted using an encryption key provided to the router when the router registered to subscribe to the service.

6. The method of claim 1 wherein the router and the server communicate over the Internet.

* * * * *